US006896801B2

(12) United States Patent
Anderson et al.

(10) Patent No.: US 6,896,801 B2
(45) Date of Patent: May 24, 2005

(54) METHOD AND APPARATUS FOR MAGNETIC SEPARATION OF PARTICULATES FROM LIQUIDS

(75) Inventors: Raymond L. Anderson, Walled Lake, MI (US); Jason L. Sisler, Cannonsberg, PA (US)

(73) Assignee: H.R. Black Co., Inc., Sterling Heights, MI (US)

( * ) Notice: Subject to any disclaimer, the term of this patent is extended or adjusted under 35 U.S.C. 154(b) by 40 days.

(21) Appl. No.: 10/654,551

(22) Filed: Sep. 3, 2003

(65) Prior Publication Data

US 2005/0045547 A1    Mar. 3, 2005

(51) Int. Cl.$^7$ ............................ B01D 35/06; B03C 1/02
(52) U.S. Cl. ..................... 210/222; 210/396; 210/400; 209/213; 209/226
(58) Field of Search ............................. 210/222, 223, 210/695, 396, 400; 209/213, 226

(56) References Cited

U.S. PATENT DOCUMENTS

| | | | | |
|---|---|---|---|---|
| 4,206,000 A | * | 6/1980 | Schuchardt et al. | ........ 210/222 |
| 6,277,276 B1 | * | 8/2001 | Bratten | ....................... 210/222 |
| 6,638,430 B2 | * | 10/2003 | Bratten | ....................... 210/222 |

* cited by examiner

Primary Examiner—David A. Reifsnyder
(74) Attorney, Agent, or Firm—Dykema Gossett PLLC (57) ABSTRACT

The magnetic separator has a tank with a pair of dual conveyor chains, spaced apart, at opposite sides of the tank. A plurality of frames with spaced apart magnetic rods are suspended from the conveyor chains in a manner allowing the frames to swivel and always hang vertically as the chains traverse their endless path. The liquid in the tank flows through the frames and ferrous particles are attracted to the magnetic rods. The rods are cleaned and the ferrous particles removed at a wiping station. Each frame has a scraping edge which contacts the bottom of the tank and drags out the non-magnetic particulate which has separated from the liquid.

30 Claims, 8 Drawing Sheets

METHOD AND APPARATUS FOR MAGNETIC SEPARATION OF PARTICULATES FROM LIQUIDS

BACKGROUND OF THE INVENTION

This invention relates to a method and apparatus for magnetically separating ferrous particulates or particles from metal working coolants and parts washing fluids.

Some industrial processing liquids such as machine or metal working coolants are processed through magnetic rod separators typically embodying dual conveyor chains, spaced apart, with the magnetic rods suspended between them. The rods are arranged in a parallel fashion with a small gap between them for the fluid to flow through. The conveyor chains describe a loop within the tank wherein the fluid must travel from outside the loop to the inside of the loop as it flows to the outlet located in the tank. With the prior art separators, the fluid passes through the magnetic rods as desired but the fluid merely passes through them a single time or pass. It is appreciated that the fluid has a propensity to flow only through the magnetic rods closest to the inlet.

SUMMARY OF THE INVENTION

Unlike other magnetic separators, the method, process and apparatus of the present invention utilizes spaced apart magnetic rods mounted in frames which attract the ferrous particles of the liquid being treated. Each frame is suspended between a pair of conveyor chains located in a tank in a manner allowing each frame to swivel and always hang vertically in the tank as the chain follows its endless path. The frames span the width of the tank such that the liquid must flow through the magnetic gaps of the frames as the liquid travels from the inlet of the tank to the outlet.

By increasing the length of the tank, many additional frames can be suspended in the flow providing a "multi-pass" effect rather than a "single" effect as in the prior art. The frames travel the length of the tank, with each frame being designed to contact and to scrape the floor of the tank and to drag out the particulate that is non-magnetic. The liquid or coolant is forced to flow through all of the magnetic rods located in the tank, not merely the frame closest to the inlet as is the situation with the prior art.

A feature of the present invention is that the magnetic separator includes a number of major components including a main tank which receives the metal working coolants or part washing fluids and where the magnetic frames are suspended. The tank has an inclined wall, forming a drag ramp where the non-ferrous particulate is dragged out from the tank by the action of the moving frames. The frames are attached to an endless chain conveyor that conveys the frames through the main tank, up the drag ramp to a wiping station where the frames are wiped to remove the ferrous particles or particulate.

Another feature of the present invention is that the magnetic frames each has a plurality of magnetic rods or tubes which are spaced apart and arranged parallel to each other with small gaps between them. The rods or tubes are mounted in a frame which transports them through the tank. The frame is designed, as mentioned previously, with a scraping edge that contacts the floor of the tank when the frame is traversing the lower tank track.

Still another feature of the present invention is the provision of the track system which guides the conveyor chains through the tank and up the drag ramp. The track system includes an upper tank track, a lower tank track, an upper ramp track and a lower ramp track. In addition, the lower tank and ramp tracks are provided with an upper guide track which maintains the conveyor chains on the lower tank and ramp tracks as the conveyor chains proceed in an endless path.

A further feature of the present invention is the provision of the wiper blades at a wiping station located at the upper end of the drag ramp. The wiper blades are spring loaded in a closed position. As a magnetic frame travels up the ramp, the frame contacts a trip lever which opens the wiper blades. After the frame top has passed the trip lever, the blades close on the magnetic rods and wipe off the collected ferrous particulate. When the bottom end of the frame approaches, a protrusion on the frame made for this purpose contacts the trip lever and the blades again open to allow the bottom of the frame to pass.

A still further feature of the present invention is the provision of a wiper cam which is attached to the trip lever. When the trip lever is rotated by the moving frame, the cam action forces the blades apart. After the frame has cleared, the springs close the wiper blades.

Another feature of the present invention is that as each frame exits the wiper station or wiper blades, it is necessary to reroute the bottom of the frame from the lower ramp track to the upper ramp track. This is accomplished by providing a novel switch track which has a stationary track part and a pivoted or movable track part. The movable part of the switch track is hinged to allow it to be lifted by the frame as the frame swings upward and forward. Once the frame has cleared the switch track, the pivoted track then falls back due to gravity and forces the frame to follow the upper ramp track as the conveyor chains return to the main tank.

Still another feature of the present invention is that the magnetic separator is not required to operate continuously. As the frames are conveyed through the tank, periodically a frame on the upper tank track is positioned directly above the frame on the lower tank track. Allowing the frames to dwell in this position is desirable in that it presents no alternative path for the fluid to flow except through the magnetic gaps of the frames. The apparatus may be provided with suitable controls that can be used to allow the conveyor to stop in this desirable position for long periods of time while the magnetic rods attract the fluid borne ferrous particulates or particles. Then, on a time basis, the conveyer drive will advance one frame through the wiper mechanism and thereafter the frame will strike a limit switch which halts the conveyor once again in this desirable dwell position.

It is a further feature of the present invention to provide a magnetic separator or apparatus which is economical to manufacture, efficient to operate and is environmentally acceptable in the treatment of metalworking coolants and parts washing fluids.

DETAILED DESCRIPTION OF THE PREFERRED EMBODIMENT

Figure 1:
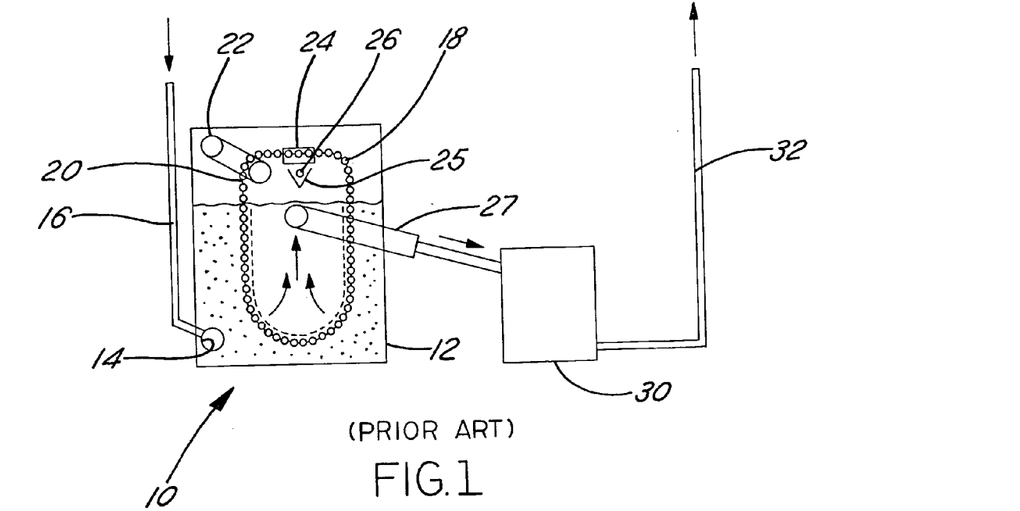
FIG. 1 is a diagrammatic view of a prior art magnetic separator where the dirty coolant makes a single pass through the magnetic bars.

A bar type magnetic separator of the prior art is diagrammatically illustrated in FIG. 1. The separator 10 includes a tank 12 having an inlet 14 and pipe 16 through which metal working coolants or other dirty fluids or liquids enter the tank 12. Mounted in the tank 12 is an endless array of magnetic bars 18 connected to a chain drive mechanism 20 driven by a drive 22. Wiper blades 24 are provided at the top of the tank 12 and through which the magnetic bars 18 move in an endless path and where the bars 18 are wiped by the wiper blades 24. The ferrous particles from the magnetic bars 18 are directed into a hopper 25 and are removed from the hopper 25 by an auger 26. It should be noted that the magnetic separator 10 is a "single" path separator wherein the fluid enters the tank 12 at the bottom and passes through the bars 18 closest to the inlet 14 into the center of the chain mechanism 20 where the liquid after a single pass exits the tank 12 through an exit tube 27. The fluid or liquid that is cleaned is directed to a clean solution tank 30 from where the fluid is recirculated via the line 32 for reuse.

Figure 2:
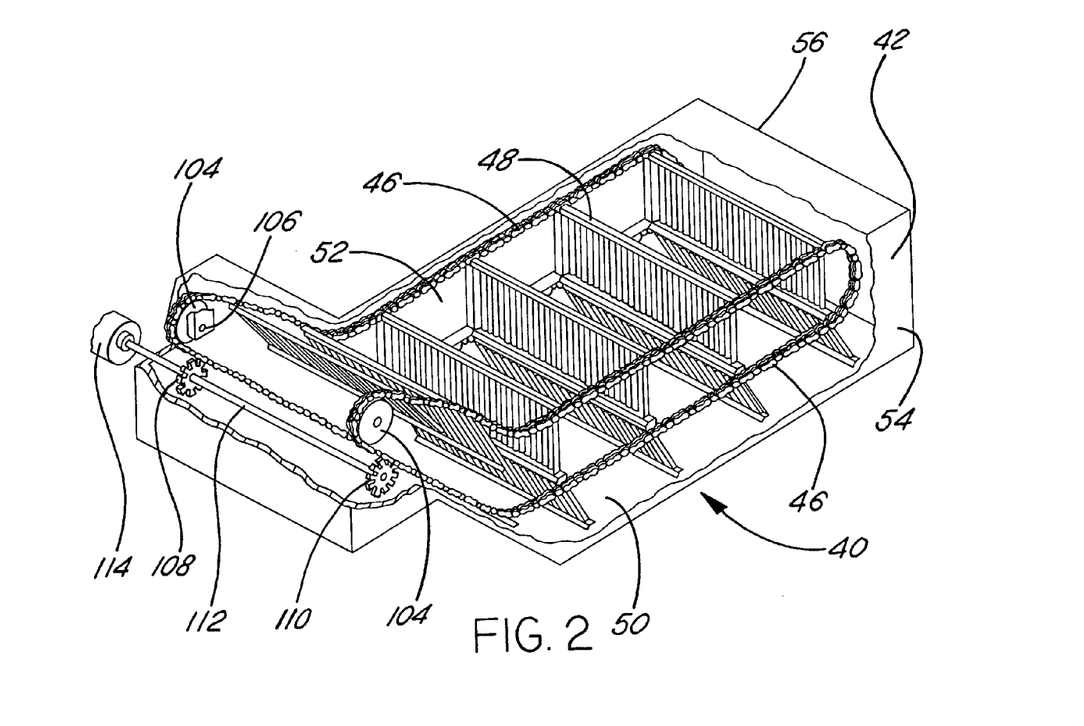
FIG. 2 is an isometric view of the magnetic separator, with parts broken away to illustrate the dual conveyor chains supporting and moving a plurality of frames carrying magnetic rods through the dirty coolant.

The magnetic separator of the present invention is designated by the numeral 40 in FIG. 2. It consists of an elongated tank 42, a pair of transversely spaced apart endless conveyor chains 44 and 46 and a plurality of longitudinally spaced magnetic frames 48 which are suspended from the conveyor chains 44 and 46 and are moved by the conveyor chains through the dirty liquid coolant or parts washing fluid located in the tank 42.

Figure 3:
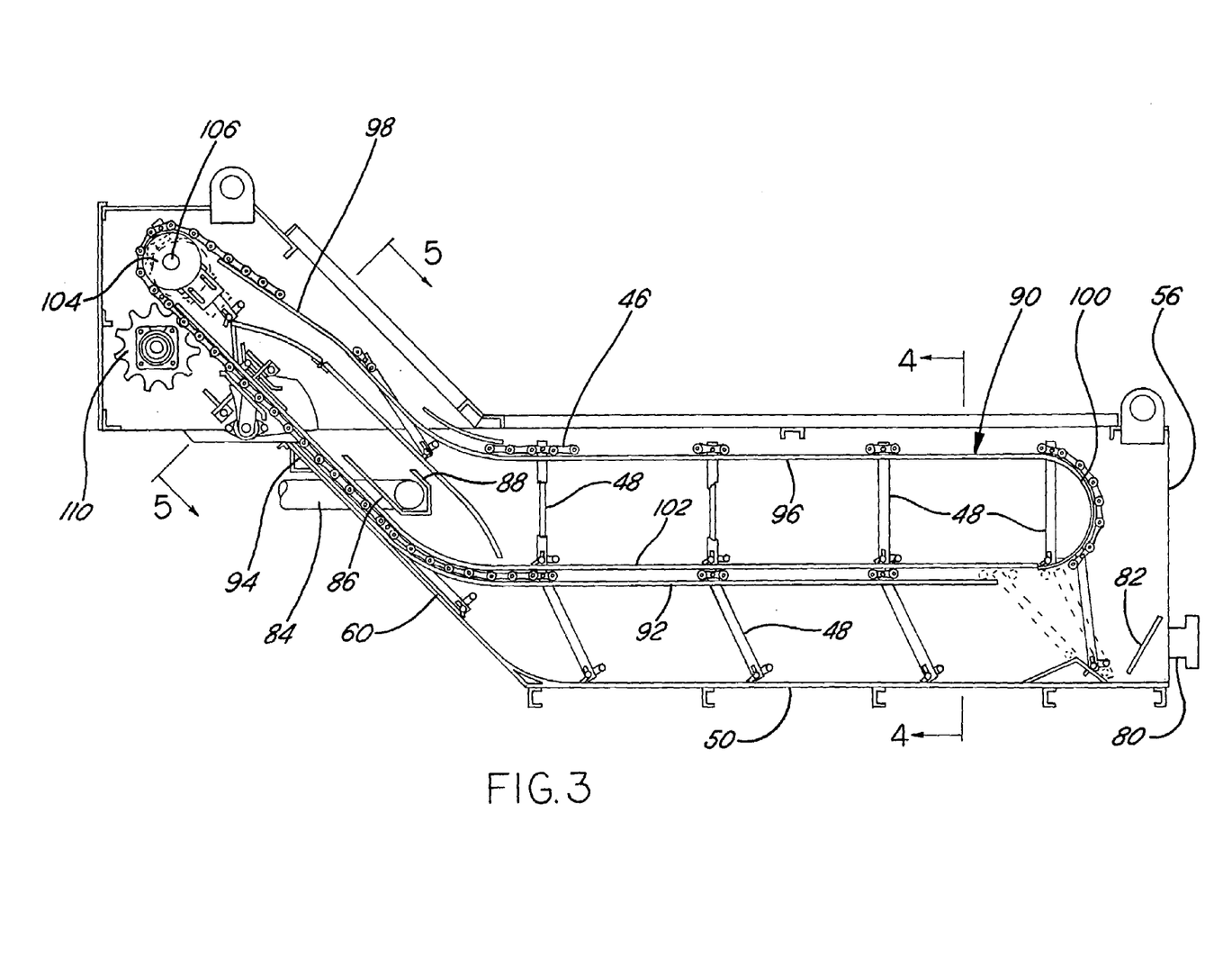
FIG. 3 is a side elevational view of the magnetic separator, with the side of the separator tank removed to expose the interior thereof.

The elongated tank 42 has a bottom wall 50, a pair of side walls 52 and 54 connected to the bottom wall 50, a front wall 56 connected to the bottom wall 50 and the side walls 52, 54. The front wall 56 is located at one end of the tank 50 where the fluid enters the tank 42. The tank 42 further includes a ramp or ramp wall 60 at the other end of the tank 50 extending upwardly from the bottom wall 50 and in a direction away from the front wall 56 to form an upwardly and outwardly inclined ramp as best illustrated in FIG. 3. The ramp wall 60 has the edges thereof connected to the side walls 52 and 54. The top of the tank 42 is normally open.

An inlet 80 is provided in the end wall 56 of the tank 42 for directing liquids or coolants containing ferrous particles and other particulate into the tank 42. An inlet baffle 82 extends between the side walls 52 and 54. The baffle 82 is spaced a short distance from the inlet 80 for the purpose of reducing the velocity of the incoming flow of the coolant and to distribute the coolant flow evenly across the width of the tank 40. The baffle 82 assists in producing laminar liquid flow in the tank 42. The flow through the tank 40 may be reversed in direction than that which is illustrated and described.

The tank 42 has an outlet 84 which extends from an outlet trough 86 located in the tank 42 above the ramp 60. The trough 86 extends between the side walls 52, 54 of the tank 42 and includes a dam or weir 88 over which the fluid flows as it exits the tank 42. The weir 88 determines the height of the liquid in the tank 42.

The magnetic separator 40 includes a novel track system 90 mounted in and extending lengthwise of the elongated tank 42. The track system 90 includes a lower tank track 92, a lower ramp track 94 which forms a continuation of the lower tank track 92, an upper tank track 96 and an upper ramp track 98 which is a continuation of the upper tank track 96. The upper tank track 96 is spaced above the lower tank track 92 while the upper ramp track 98 is spaced above the lower ramp track 94. The upper tank track 96 at the inlet end of the tank 48 is provided with a curved track portion 100 which is a continuation of track 96. The endless conveyor chains 44, 46 each moves in an endless path along the upper tank track 96 around the track portion 100 and onto the lower tank track 92 as illustrated in FIG. 3. Thereafter the chains 44, 46 continue to be driven towards the discharge end of the tank 42 where the conveyor chains each follows its respective upper ramp track 94. A pair of chain guards 102 are spaced above the lower tracks 92 and 94 for the purpose of keeping the chains on the tracks.

The upper ends of the conveyor chains 44 and 46 are mounted on a pair of plastic wheels or discs 104. The wheels 104 are mounted on short stub shafts 106 allowing the frames 48 to pass between the stub shafts 106. The stub shafts 106 are mounted in a manner that allows them to be adjusted to remove chain slack that develops in chains 44 and 46 over time. Chains 44, 46 are driven by sprockets 108, 110 mounted on opposite ends of a shaft 112. The sprockets 108, 110 are drivingly connected to a motor or drive mechanism 114 as diagrammatically illustrated in FIG. 2.

With the construction of the magnetic separator 40 just described, it will be appreciated that the pair of transversely spaced apart endless conveyor chains 44 and 46 are movably mounted in the tank 42 and are guided by the track system 90 consisting of the tracks 92, 94, 96 and 98, with the conveyor chains describing an endless loop within the tank 42.

The plurality of longitudinally spaced magnetic frames 48 are mounted in the tank 42. Each magnetic frame 48 extends transversely or across the tank 42 between the side walls 52, 54. Each magnetic frame 48 has an upper end and a lower end, with the upper end of each frame suspended from the conveyor chains 44 and 46 as shown in FIG. 2.

Figure 12:
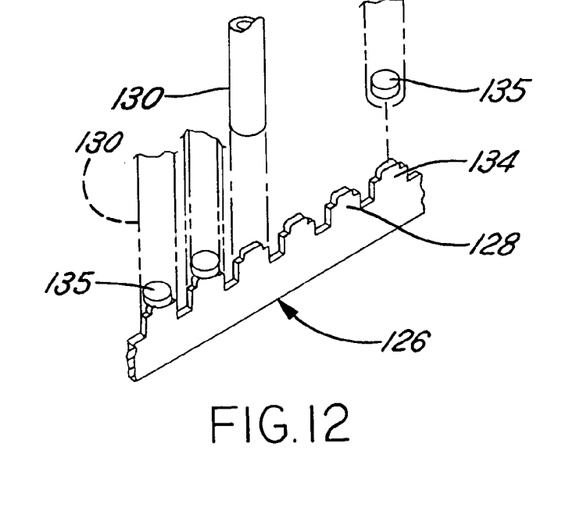
FIG. 12 is a fragmentary perspective view of the tube support forming the lower end of the frame and illustrating the nipples which fit into the lower ends of the tubes of the magnetic frame to close the tubes.

Each magnetic bar frame 48 comprises an elongated tubular member or box tube 120 of generally square or rectangular configuration as illustrated in FIG. 12 forming the upper end of the frame. The box tube 120 has a longitudinally extending axis 124 (FIG. 8) and a pair of parallel end surfaces 122 which are perpendicular to the longitudinal axis 124. The other end of the magnetic bar frame 48 includes an elongated tube support 126 forming the lower end of the frame 48. The tube support 126 has a series of upstanding ribs 128 which are spaced apart and separated by gaps 129. Thus, the top edge of the tube support 126 is provided with a series of alternating ribs 128 and gaps 131. The ribs 128 provide support for the tubes or rods 130 made from non-ferrous material. The rods 130 are provided with a plurality of bar magnets 132 and pole pieces 133 stacked in end-to-end abutting relationship in each of the tubes between the tubular member 120 and the tube support 126. The lower end of each tube 130 engages a nipple or protrusion 134 which is part of rib 128 and extends into the corresponding lower end of the tube 130 for locating same. Each pole piece 133 is in the form of a round ferrous plate located between each pair of magnets 132. The plate or pole piece 133 focuses the magnetic field as a ring around the tube 130. A plug 135 is installed in both ends of each tube 130 prior to installing the tube in the frame. Plug 135 has the dual function of containing the magnets 132 and pole pieces 133 and sealing the ends of the tube. Each plug 135 is driven deeply enough into the tube 130 to leave a short space at the ends. This space is where the nipple or protrusion 134 will fit when the tubes 130 are mounted in the frame 48.

A guide plate 136 secures the upper ends of the tubes 130 and abuts the bottom of the box tube 120 when assembled. The plate 136 has spaced apart openings 137 which are aligned with the open ends of the tubes 130. The bar frames 48 further includes a pair of longitudinally spaced supports 138 at the sides. The side supports 138 have the edges thereof attached to the box tube or tubular member 120 and to the tube support 126. The tubes or rods 130 are spaced vertically apart to form gaps, equal in width to gaps 131, through which the liquid flows.

Figures 7, 8:
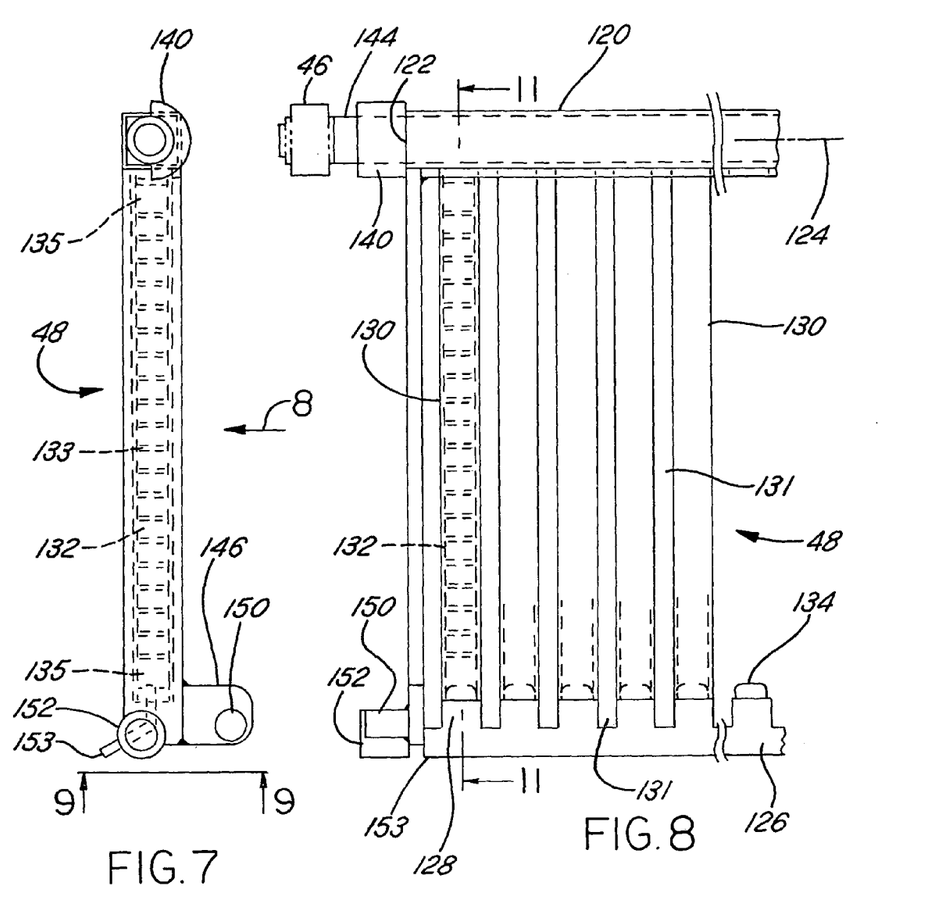
FIG. 7 is a side view of the magnetic frame.
FIG. 8 is a fragmentary elevational view of the magnetic frame looking in the direction of arrow 8 of FIG. 7.

The magnetic bar frame 48 further includes a tubular pipe 142 having a longitudinal axis which is coincidental with the axis 124 of the box tube 120. The tubular pipe 142 extends through the box tube 120 and has end portions 144 extending beyond the end surfaces 122 of the tubular member 120. Stop elements 140 extend over the ends of the pipe 120 and abut the end faces 122 of the box tube 120 as shown in FIG. 8. The outer end portions 144 of the tubular pipe 142 are attached to the endless conveyor chains 44 and 46 in order to suspend the frames from the conveyor chains.

Figure 9:
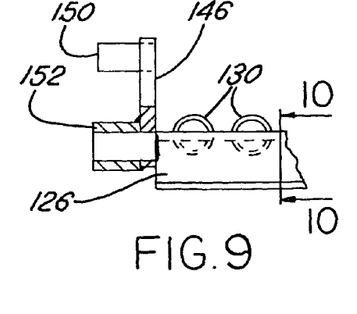
FIG. 9 is a bottom view of the magnetic frame, rotated 90°, looking in the direction of arrows 9—9 of FIG. 7.
Figure 10:
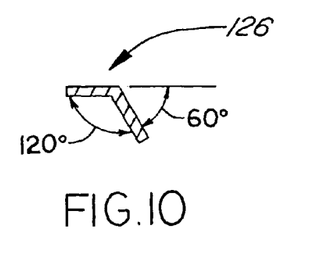
FIG. 10 is a sectional view through the tube or rod support taken on the line 10—10 of FIG. 9.
Figures 11, 13:
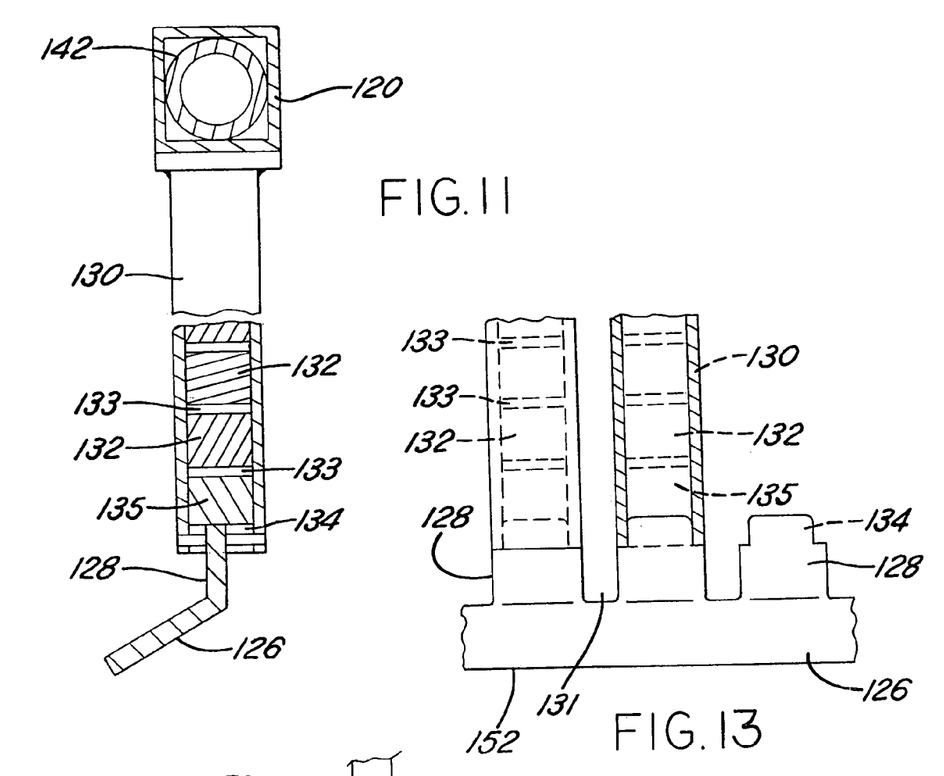
FIG. 11 is a fragmentary sectional view taken on the line 11—11 of FIG. 8.
FIG. 13 is a fragmentary elevational view of the tube support, nipples and tubes.

The tube support 126 is provided at the lower end thereof with a pair of transversely spaced apart brackets 146 carrying lift pins 150 as shown in FIGS. 7–9. In addition, the tube support 126 includes at opposite ends thereof tubular guide pins 152. The elongated tube support 126 is bent or configured to form a scraper edge or blade 153 at the lower end of the frame 48 that contacts the floor or bottom wall 50 when the frame 48 is traversing the lower tank track 92.

As the magnetic frames 48 are moved through the liquid or fluid to be cleaned, the ferrous particles within the dirty fluid are attracted to the magnetic rods or tubes 130 throughout the length thereof as the fluid travels through the space or gaps between the tubes 130 from the entrance end to the exit end of the tank 42. The non-ferrous particles or particulates which are not attracted to the magnetic frames 48 settle out on the bottom of the tank 42. The frames 48 as they move through the tank 42 have the lower edges thereof 153 scraping the bottom of the tank 42 and the tank ramp 60 so as to move the settled out particulates up the ramp 60 to an exit provided in the ramp wall where the particulates may be collected in a hopper, not shown, and thereafter moved to a separate facility.

It is necessary to remove from the magnetic tubes 130 the ferrous material attracted thereto. This must be done prior to recirculating the frames 48 within the tank 42. There is provided at the exit or driven end of the conveyor system a wiping station 160 which is constructed and designed to sequentially receive the magnetic frames 48 and to wipe the ferrous particles from the magnetic tubes 130 contained within the frames.

Referring now to FIGS. 3, 5, 6, 18 and 19, there is illustrated a wiping station 160 which is triggered by movement of the magnetic frame 48 up the ramp 60. The wiping station 160 includes a lower wiper arm assembly 162 and an upper wiper arm assembly 170. The assembly 162 includes a sliding support arm 164 having the ends thereof mounted in attachment aids 165. A lower wiper blade 166 is attached to the arm 164. The upper edge of the wider blade 166 is provided with a serrated wiper strip 167 of semi-circular configuration and designed to fit around and wipe the tubes 130 of the frame 48 as it passes therethrough. The wiper strip 167 is made from a flexible urethane material that can be replaced when worn. The wiper strip 167 is bolted to the wiper blade 166 which is attached to the wiper support am 164. The upper wiper arm assembly 170 includes a support arm 172 having the ends mounted in attachment aids 173. Outboard of the attachment aids 173 are cam bearings 174. The support arm 172 carries a wiper blade 176. A wiper strip 177 corresponding to the configuration of the other wiper strip 167 is also made from flexible urethane material and the wiper strip 177 is replaceable when worn. The wiper strip 167 and 177, when closed, wipe the magnetic particles from the tubes 130.

Figure 5:
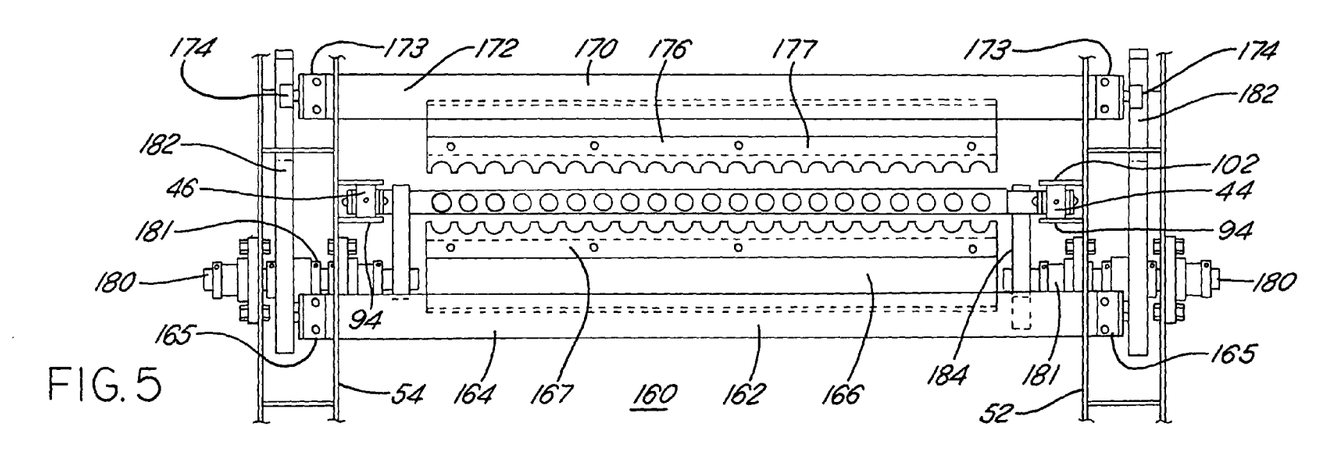
FIG. 5 is a transverse view, with parts broken away, of the wiper blades illustrated in an open position and taken on the line 5—5 of FIG. 3.
Figure 6:
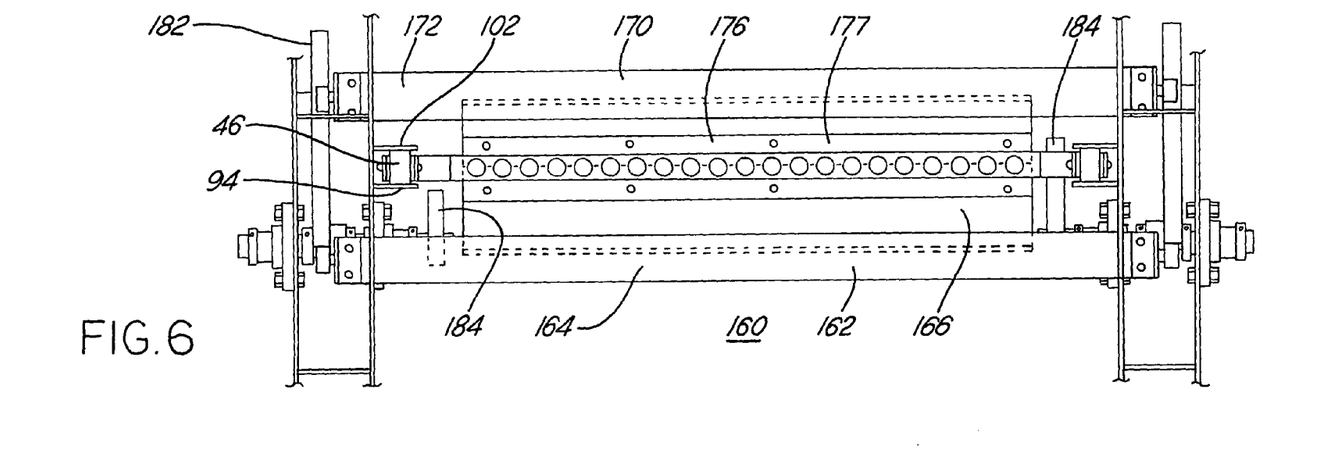
FIG. 6 is a view similar to FIG. 5, illustrating the wiper blades in a closed position.

The support blades 166 and 172 each have end portions mounted in slots provided in the side walls 52 which permit the support blades 166 and 172 to slide vertically up and down as viewed in FIGS. 5 and 6 to open and close.

The wiper arm assembly 162 includes at each side of the apparatus a shaft 180 on which is mounted a cam 182 engageable with a cam bearing or roller 174. The cam bearings or rollers 174 are provided on the ends of the support blades 166 and 172 and ride on the cams 182. As the cams 182 rotate, the rollers 174 ride up the profile of the cams 182 and force the blades 166 and 172 to open against pressure of springs 188.

Figures 17, 18, 19:
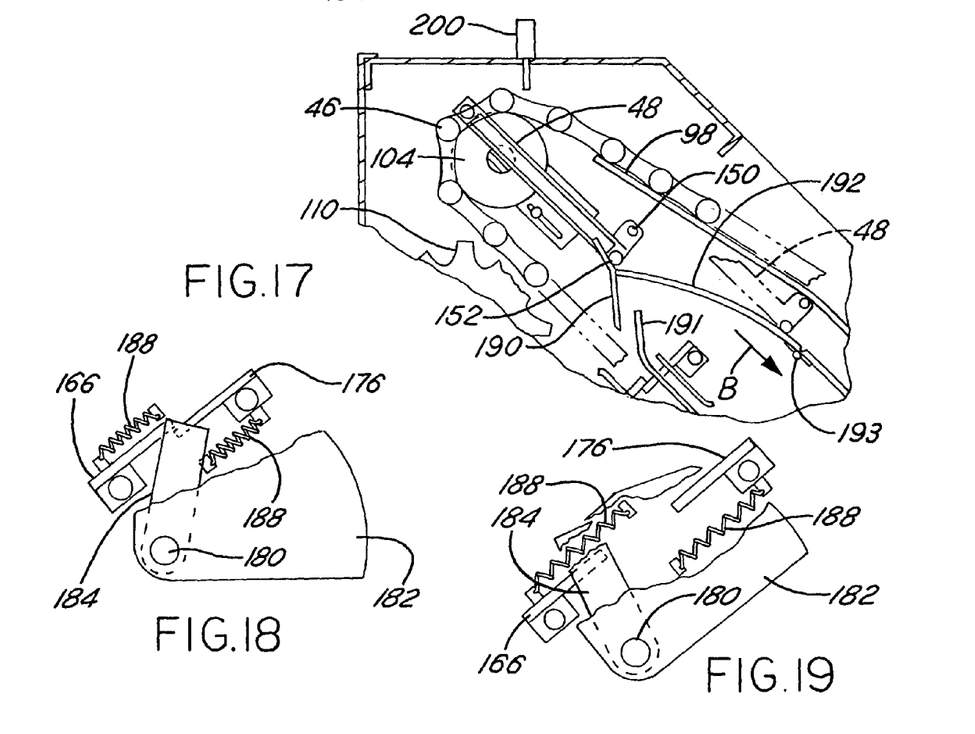
FIG. 17 is a view similar to FIGS. 14–16, illustrating the pivoted switch track returning to a closed position as a result of gravity, with the moving frame having cleared the opening traveling on the upper ramp track and moving down the upper ramp track in the direction of arrow B.
FIG. 18 is fragmentary view of the cam and trip lever for the wiper blades of FIGS. 5 and 6, showing the springs for biasing the wiper blades to a closed position.
FIG. 19 is a view similar to FIG. 18, illustrating the wiper cam, trip lever and springs in a position corresponding to the open position of the wiper blades.

Inboard of the side walls 52 and 54 of the tank 42 there is provided a trip lever 184 having one end also mounted on the shaft 180. Each shaft 180 is mounted in a plurality of bearings 181. The support blades 166 and 176 are provided at their opposite ends with springs 188 as shown in FIGS. 18 and 19. The wiper blades 166 and 176 are spring loaded in the closed position as shown in FIG. 18. As a magnetic frame 48 travels up the ramp wall 60, the frame 48 contacts the trip levers 184 which opens the wiper blades 166, 176. After the frame top has passed the trip levers 184, the blades 166, 176 close on the magnetic rods 130 of the frame 48 and wipe off the collected ferrous particulate. When the bottom end of the frame 48 approaches, the wiper blades 166, 176 protrusions or lower trip pins 152 on the frame 48 made for this purpose contact the trip lever 184 and the blades 166, 176 again open to allow the bottom of the frame 48 to pass therethrough, with the ferrous materials removed from the frame 48 as a result of the wiping operation. It will be appreciated that the wiper cams 182 are attached to the trip levers 184 through the shafts 180. When the trip levers 184 are rotated by the moving frame 48, the cam action forces the blades 166, 176 apart. The wiper blades may be actuated by other means such as pneumatic cylinders.

As the frame 48 exits the wiper blades 166, 176 as shown in FIGS. 5 and 6, it is necessary to reroute the bottom of the frame 48 from the lower ramp track 60 to the upper ramp track 98. This is accomplished by the use of a switch track which consists of a stationary part 190, a stationary upwardly inclined part or ramp 191 and a pivoted hinge part or door 192 pivotally connected to a switch guide track 194. A pivot connection 193 is provided between track parts 192, 194. The switch track also includes a ramp 189 for the tubular guide pins 152 as the frame 48 moves upwardly.

Figure 14:
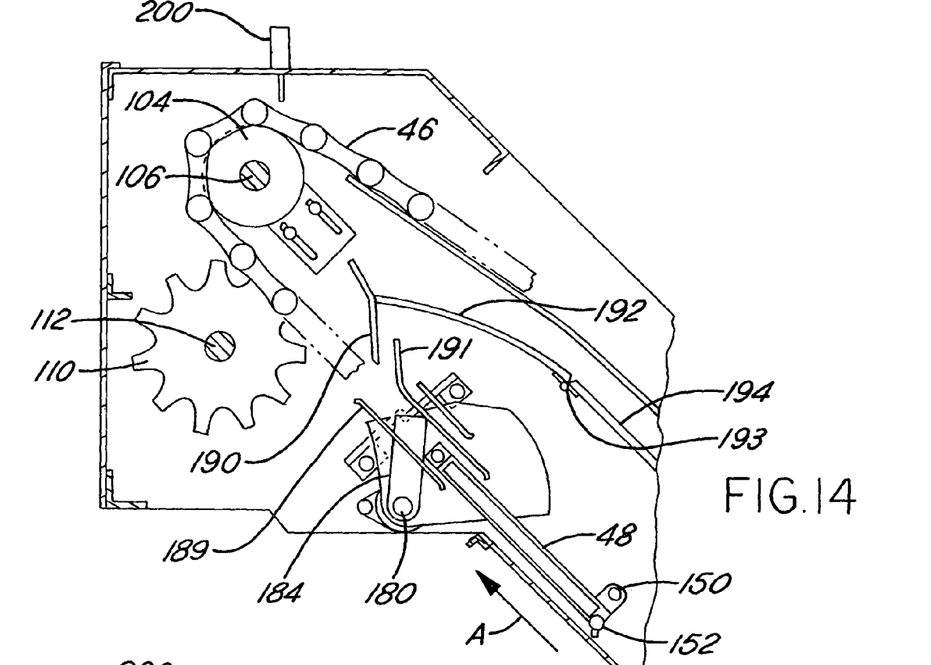
FIG. 14 is a fragmentary view of the drive end of the conveyor chains, illustrating a magnetic frame moving up the ramp in the direction of arrow A, with the top of the frame approaching the switch track.
Figure 15:
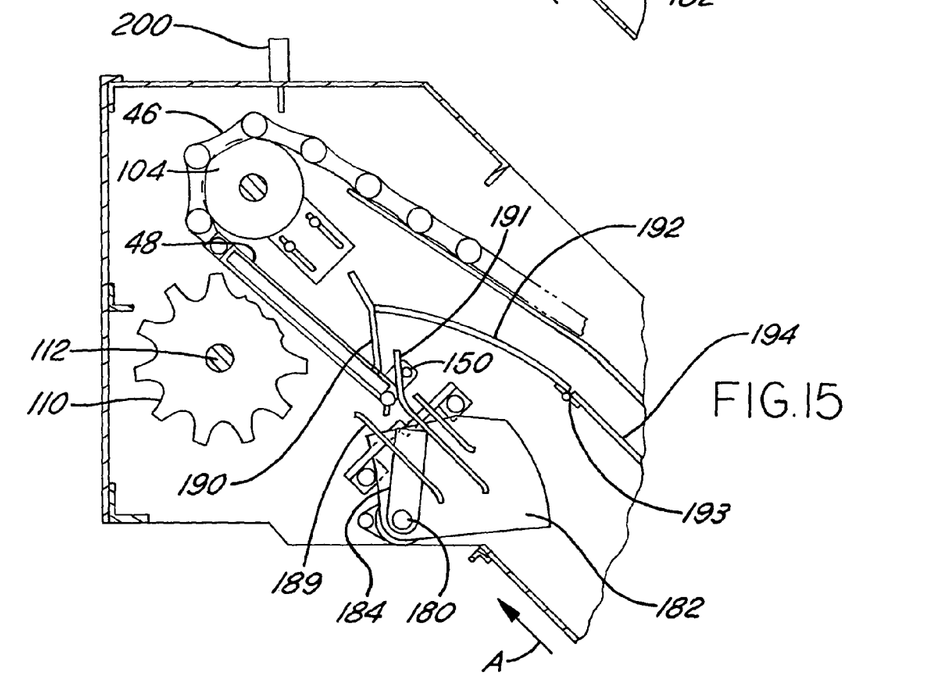
FIG. 15 is a view similar to FIG. 14, illustrating the bottom of the moving magnetic frame rising from the lower ramp track.
Figure 16:
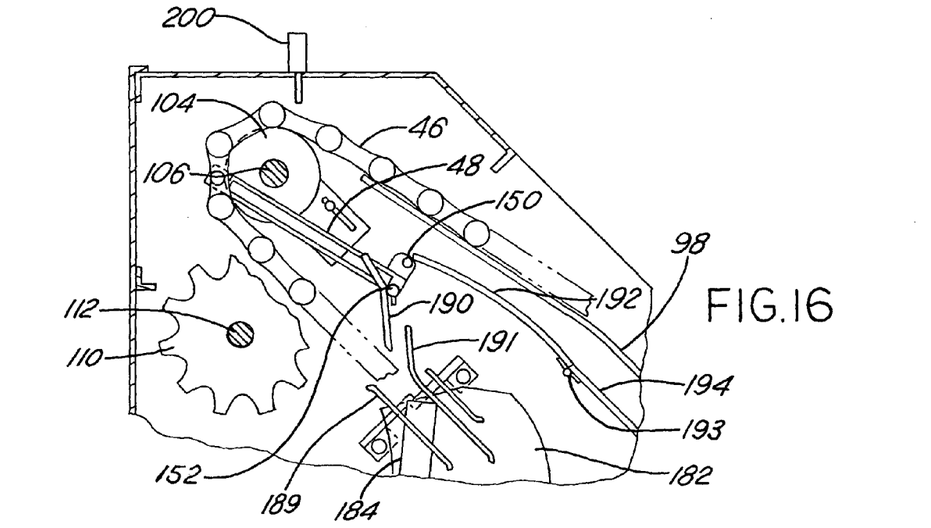
FIG. 16 is a view similar to FIGS. 14 and 15, illustrating the lower end of the moving magnetic frame lifting the pivoted switch track and moving through the opening.

As shown in FIGS. 14 and 15, as the magnetic frame 48 travels in the direction of arrow A and after it has exited the wiper blades 166, 176, it moves up the ramp 60 where the pins 150 at the lower end of the frame 48 engages the stationary upwardly inclined ramp 191 of the switch track as shown in FIG. 15. The bottom end of the frame 48 then changes direction and moves up the inclined switch track part 190 which is stationary as shown in FIGS. 16 and 17. At the upper edge of the switch track part 190, the pins 152 on the lower edge of the frame 48 engage the movable pivoted track 192 and raises same away from the stationary track part 190 thereby creating an opening between the stationary part 190 and the pivoted part 192 which permits the lower end of the frame 48 to clear the stationary track 190. Thereafter, the pivoted track 192 returns by gravity to its position engaging the stationary part 190 as shown in FIG. 17. As a result thereof, the frame 48 has cleared the opening and is on the other side of the moveable door 192. As the chains 44, 46 continue to move, the frame 48 now travels in a reverse direction, in the direction of arrow B of FIG. 17. The frame 48 is now guided by the pivoted door 192 and the track part 194 as it moves in the direction of arrow B. Thus, the frame 48 follows the upper ramp track 98 as the conveyor chains return to the main tank 42.

Figure 4:
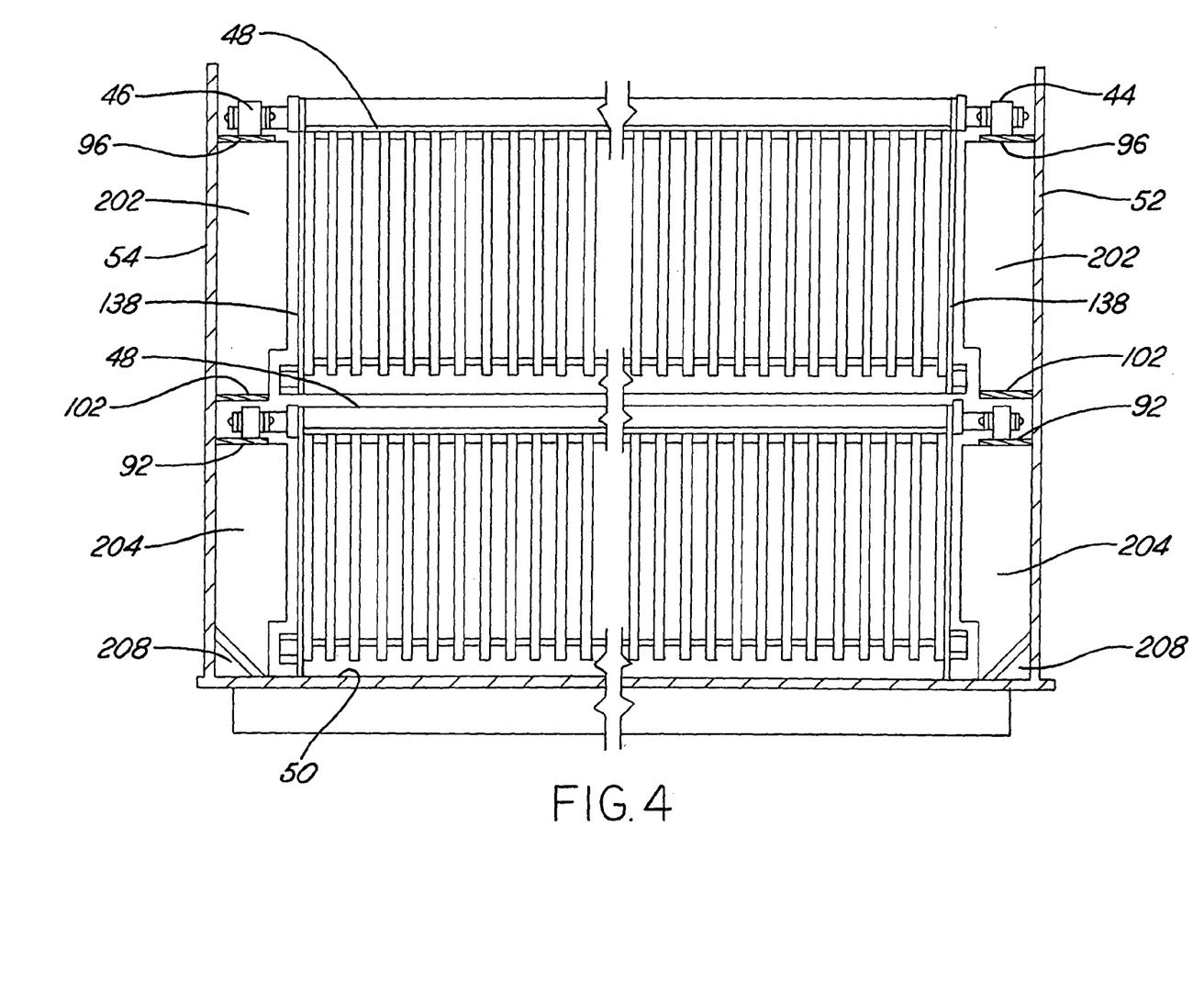
FIG. 4 is a sectional view, with parts broken away, taken on the line 4—4 of FIG. 3.

It is not necessary for the conveyor drive to operate continuously. As the frames 48 are conveyed through the tank 42, periodically a frame 48 on the upper track 96 is positioned directly above the frame 48 on the lower track 92 as is shown in FIGS. 2, 3 and 4. Allowing the frames 48 to dwell in this position is desirable in that it presents no alternative path for fluid to flow except through the magnetic gaps of the frame 48. Therefore, suitable controls may be used to allow the conveyer to stop in this desired position for long periods of time while the magnetic rods 130 attract the fluid borne particulate or ferrous particles. Then, on a timed basis, the drive advances one frame through the wiper station 160 until the limit switch 200 is contacted to halt the conveyor chains once again in this desirable position. Suitable relay means may be provided to change the dwell time as required.

By increasing the length of the tank 42, many more frames 48 can be suspended in the flow providing a "multi-pass" effect. The frames 48 travel the length of the tank 42 and the coolant is forced to flow through all the magnetic rods 130 located in the tank 42, not merely the magnetic rods 48 closest to the inlet as in the prior art.

The magnetic separator 40 is provided with a plurality of upper and lower tank baffles and side ramps. The upper tank baffles 202 are provided in the space between the side walls 52, 54 and the ends of the frames 48 below the top track 96 and above the guide rail 102 as shown in FIG. 4. In addition, lower tank baffles 204 are provided in the space between the side walls 52, 54 and the ends of the frames 48. In addition, a pair of side baffles 208 are also provided. Each baffle 208 is a sloping plate which extends the entire length of the floor. Its function is to provide a slope in order that particulate does not settle in this area since the frames 48 do not drag closely to the tank walls. The descriptor 204 does not touch the sloping plate baffle 208.

Thus, the present invention provides a new method and apparatus of magnetically separating ferrous particles from metal working coolants and parts washing fluids. The magnetic rods are mounted in frames suspended between the conveyor chains in a manner allowing the frames to swivel and always hang vertically as the chain follows its path. With such a construction, the fluid or liquid in the tank is forced to flow through all the gaps between the rods in the tank. Each gap is approximately one half inch in width. The ferrous particles are attracted to the magnetic rods or tubes. Later the tubes are wiped clean at the wiping station and the ferrous particles are collected and removed from tank. The steel scraping edge at the bottom of each frame contacts the floor and ramp and drags out the settled non-magnetic particles or particulate from the tank.

We claim:

1. A magnetic separator comprising:
   an elongated tank having a bottom wall, a pair of side walls connected to said bottom wall, a front wall connected to said bottom and side walls at one end of said tank and a ramp wall at the other end of said tank extending upwardly from said bottom wall and in a direction away from said front wall to form an upwardly and outwardly inclined ramp having the edges thereof connected to said side walls;
   an inlet provided in a wall of said tank for directing liquids containing ferrous particles and other particulate into said tank;
   an outlet provided in a wall of said tank where the liquid after treatment exits said tank;
   a track system mounted in and extending lengthwise of said tank including a lower tank track, an upper tank track spaced above said lower tank track, a lower ramp track and an upper ramp track spaced above said lower ramp track;
   a pair of transversely spaced apart endless conveyor chains movably mounted in said tank and guided by said track system, said conveyor chains describing an endless loop within said tank;
   a plurality of longitudinally spaced magnetic frames in said tank, each frame extending across said tank between said side walls and having an upper end and a lower end, with said upper end of each frame suspended from said conveyor chains;
   each of said frames carrying a series of parallel magnetic rods which are spaced apart to form magnetic gaps and through which the liquid passes as the conveyor chains and frames traverse said tank, with the ferrous particles in the liquid being attracted to and deposited on said magnetic rods;

the lower end of each frame being provided with a scraper edge that contacts the bottom and ramp walls of the tank when the frame is traversing the lower tracks to scrape the particulate from the bottom and ramp walls and move the particulate towards the other end of said tank where it is discharged;

each frame as it leaves said lower tank track and enters said lower ramp track closely follows the inclination of said ramp as the frame travels up said ramp;

wiper blades located near the upper end of said ramp, each frame as it is moved by said conveyor chains up said ramp engaging a trip lever which opens said wiper blades;

each frame as it is moved by said conveyor chains after the top thereof has passed said trip lever moving through the opening between said wiper blades, said wiper blades thereafter closing on the magnetic rods of said frame to wipe and remove the collected ferrous particulate from the magnetic rods;

the lower end of each frame as it is moved by said conveyor chains and approaches said wiping blades causing a protrusion thereon to make contact with said trip lever resulting in the wiper blades opening to thereby allow the lower end thereof to pass through the openings; and a pivoted switch track which is normally closed interposed between said upper and lower ramp tracks, said switch track opening when contacted by each frame as it is swung upwards and forward, said switch track after each frame has cleared the opening falling back and forcing it to follow said upper ramp and tank tracks.

2. The magnetic separator as defined in claim 1, wherein said inlet is provided in said front wall near the bottom wall; and a baffle is mounted in said tank opposite said inlet, said baffle extending from one side wall of the tank to the other for reducing the velocity of the incoming liquid and distributing the liquid evenly across the width of the tank.

3. The magnetic separator of claim 1, wherein said outlet is located at the opposite end of the tank from said inlet; and an overflow trough in said tank forming a dam, said trough being as wide as said tank, the fluid after treatment in said tank overflowing said dam and exiting said trough through said outlet.

4. The magnetic separator of claim 1 wherein said lower tank and ramp tracks are provided with a guard vertically spaced in said tank and ramp tracks to assist in maintaining the conveyor chains on the tank and ramp tracks.

5. The magnetic separator defined in claim 1, wherein each magnetic rod includes a tube closed at opposite ends and having therein a plurality of bar magnets and pole pieces which are stacked in end-to-end abutting relationship.

6. The magnetic separator as defined in claim 1, wherein said magnetic frames each comprises an elongate tubular member having a pair of outwardly facing end surfaces, said tubular member forming the upper end of said frame and having a longitudinally extending axis, an elongated tube support spaced from and parallel to said tubular member and forming the lower end of said frame, a pair of longitudinally spaced side supports near the end portions of said tubular member and tube support, said side support having edges thereof connected to said tubular member and to said side supports, said series of magnetic rods comprising spaced tubes carried by said tube supports between said side supports; and a plurality of bar magnets and pole pieces stacked in end-to-end abutting relationship in each of said tubes between said tubular members and said tube support.

7. The magnetic separator of claim 6, wherein a tubular pipe extends through said box tubular member of each frame, said pipe and having end portions extending beyond the end surfaces of said tubular member, said tubular pipe having the ends connected to said conveyor chains.

8. The magnetic separator of claim 6, wherein said scraper edge of each frame forms part of said tube support, said scraper edge being inclined at approximately a 60° angle to the plane of said frame.

9. The magnetic separator of claim 6, wherein said tube support is provided with a plurality of nipples which are spaced apart, said nipples fitting into the inside of the tubes containing said bar magnetics and pole pieces.

10. The magnetic separator of claim 6, wherein a pair of guide pins are attached to the lower edges of the side supports of each of said magnetic bar frames.

11. The magnetic separator of claim 6, wherein a pair of lift pins are attached to the lower edges of said tube support.

12. The magnetic separator of claim 6, wherein each frame includes an elongated plate having a plurality of holes, with the holes spaced apart the same distance as the spacing between said parallel tubes, said holes permitting said magnetic bars to be inserted into said tubes during the assembly of the frame.

13. The magnetic separator of claim 1, wherein said track system is mounted along each of said side walls.

14. The magnetic separator of claim 13, wherein one of said endless conveyor chain moves in the track system along one side wall and the other of said endless conveyor chains moves in the track system along the other side wall.

15. The magnetic separator of claim 1, wherein means are provided for moving said conveyor chains in an endless path along said track system.

16. The magnetic separator of claim 15, wherein said conveyor chains moving means comprising a pair of rotary sprockets meshed with said conveyor chains, one sprocket for each conveyor chain, a drive shaft connecting said sprockets, and power means having a drive connection with said drive shaft.

17. The magnetic separator of claim 16, in which said tank has a liquid level and including means for supporting said sprockets above said liquid level.

18. The magnetic separator of claim 16, wherein said drive shaft is rotatable on a horizontal axis that extends transverse to the side walls of said tank.

19. The magnetic separator of claim 16, wherein said power means maybe be operated continuously or intermittingly where one of the magnetic frames on the upper tank track is positioned directly above a frame on the lower tank track thereby allowing the frames to dwell, without moving, while allowing the liquid to flow through the magnetic gaps of the frames, with the magnetic rods attracting the ferrous particles.

20. The magnetic separator of claim 1, said magnetic frames are suspended between said conveyor chains in a manner allowing said frames to swivel and to hang freely as the chains follows its endless path.

21. The magnetic separator of claim 1, wherein a pair of trip levers are provided, each trip lever having a wiper cam attached thereto, said trip levers when rotated by the moving frame causing the cam to rotate and force the wiper blades apart.

22. The magnetic separator of claim 21, wherein springs are provided between each wiper blade and wiper cam for biasing said wiper blades to the closed position.

23. A magnetic bar frame comprising:
(a) an elongated tubular member forming the upper end of said frame and having a pair of outwardly facing end surfaces, said tubular member having a longitudinally extending axis;
(b) an elongated tube support spaced from and arranged parallel to said tubular member and forming the lower end of said frame;
(c) a pair of longitudinally spaced side supports near the end surfaces of said tubular member and tube support, said side supports having the edges thereof connected to said tubular member and to said tube support;
(d) a plurality of longitudinally spaced tubes carried by said tube support between said side supports; and
(e) a plurality of bar magnets and pole pieces stacked in end-to-end abutting relationship in each of said tubes between said tubular member and said tube support.

24. The magnetic bar frame of claim 23, wherein a tubular pipe extends through said tubular member and having end portions extending beyond the end surfaces of said tubular member.

25. The magnetic bar frame of claim 24, wherein the outer end portions of said tubular pipe are attachable to endless conveyor chains.

26. The magnetic bar frame of claim 23, wherein an elongated scraper blade forms part of said tube support, said scraper blade having an edge which is inclined at approximately a 60° angle.

27. The magnetic bar frame of claim 23, wherein said tube support is provided with a plurality of nipples which are spaced longitudinally apart, said nipples fitting into the inside of said tubes.

28. The magnetic bar frame of claim 23, wherein a pair of guide pins are attached to the lower edges of said side supports.

29. The magnetic bar frame of claim 23, wherein a pair of lift pins are attached to said tube support.

30. The magnetic bar frame of claim 23, wherein said frame includes an elongated plate having a plurality of holes, said plate overlying the upper ends of the tubes, said holes permitting said magnetic bars and pole pieces to be inserted into said tubes.

* * * * *